I. B. Dudrey,
Making Staves.

№ 11,599.   Patented Aug. 29, 1854.

UNITED STATES PATENT OFFICE.

I. B. DUDREY, OF ATHENS, OHIO.

STAVE-MACHINE.

Specification of Letters Patent No. 11,599, dated August 29, 1854.

*To all whom it may concern:*

Be it known that I, I. B. DUDREY, of Athens, in the county of Athens and State of Ohio, have invented an Improvement for Sawing Out Staves from Logs, and that the following is a full, clear, and exact description of the principle or character which distinguishes it from all other things before known and of the usual manner of making, modifying, and using the same, reference being had to the accompanying drawings, of which—

Figure 1:
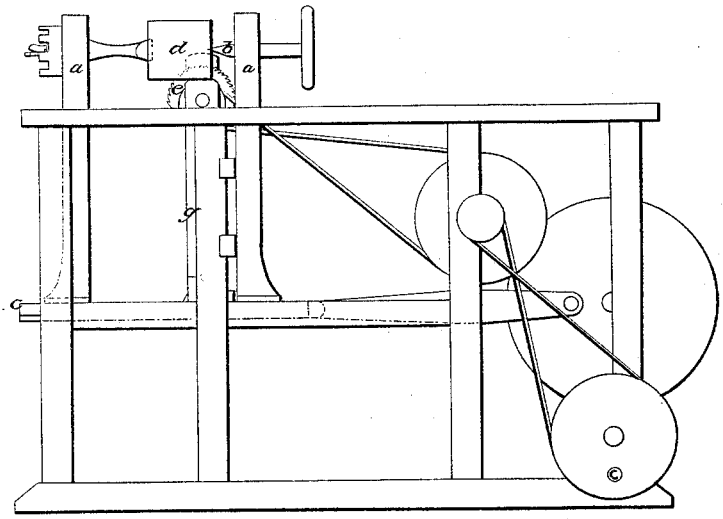
Figure 2:
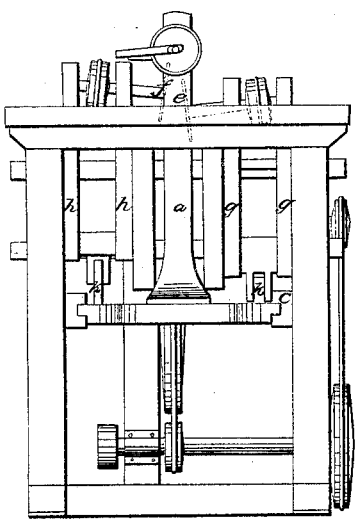

Figure 1 is a side elevation of the machine. Fig. 2 is an end view of the same.

My invention consists in sawing out staves from a log by means of saws operating alternately in such manner as to cut the log both ways, that is, while the log is moving in one direction one saw approaches the log in a direction at right angles to its axis and then cuts through one length (while the log moves one way) and on the return of the log this saw recedes out of the way and the other saw approaches and cuts another length and so on.

The log *d* supported by vertical stands *a* and *b*, receives an alternating motion from the horizontal sliding carriage *c* to which said stands are attached. Underneath the log there are two circular saws *e*, *f*, opposite to each other, the distance between them being equal to the desired thickness of the stave. The cutting edges of the saws are in opposite directions and they are revolved accordingly. The shafts of the saws have their bearings in carriage *g h* vertically movable in guideways arranged in the main frame of the machine. These vertical carriages are connected with the horizontal carriage by means of inclined planes *k* or any other well known mechanical contrivance in such a way that during the time the log moves one way one saw will be up high enough to (see the saw *f* in the drawing) cut, and the other one will be down (see the saw *e* in the drawing) its circumference not reaching the log. At the moment the log begins its return motion the first saw is lowered so as not to touch the log and the second saw is raised within the proper cutting range and so forth, thereby cutting through the log both ways. The log is made to revolve at the proper intervals by any of the known and usual contrivances for such purposes, and the saws are here shown inclined toward the center of the log.

What I claim as my invention is—

The mode substantially as set forth of sawing logs or blocks both ways by means of two circular saws so arranged and operated that the saws shall cut alternately in opposite directions, by being carried to and from the log or block as it moves back and forth, using therefor any well known mechanical means for effecting the same.

ISAAC B. DUDREY.

Witnesses:
N. ROOT,
W. H. BARTLETT.